United States Patent
Lindgren

(10) Patent No.: US 7,795,564 B2
(45) Date of Patent: Sep. 14, 2010

(54) OPTICAL SYSTEM

(75) Inventor: Mikael Lindgren, Askim (SE)

(73) Assignee: SAAB AB, Linköping (SE)

( * ) Notice: Subject to any disclaimer, the term of this patent is extended or adjusted under 35 U.S.C. 154(b) by 1368 days.

(21) Appl. No.: 10/822,734

(22) Filed: Apr. 13, 2004

(65) Prior Publication Data

US 2004/0218515 A1    Nov. 4, 2004

(30) Foreign Application Priority Data

Apr. 16, 2003  (SE) .................................. 0301137

(51) Int. Cl.
*F42B 15/01* (2006.01)
*F41G 7/00* (2006.01)
*F41G 9/00* (2006.01)
*F42B 15/00* (2006.01)

(52) U.S. Cl. .................. 244/3.1; 244/3.15; 244/3.16; 382/100; 382/103; 359/515; 359/520; 359/838; 359/850

(58) Field of Classification Search .......... 244/3.1–3.3; 359/196, 223–227, 230, 231, 234–238, 290–298, 359/515, 520, 522, 546, 618, 619, 838, 850, 359/196.1; 385/15–23; 348/207.99, 335, 348/362; 89/1.11; 382/100, 103
See application file for complete search history.

(56) References Cited

U.S. PATENT DOCUMENTS

| 4,698,602 | A | * | 10/1987 | Armitage | 359/294 |
| 5,323,002 | A | | 6/1994 | Sampsell et al. | |
| 5,345,521 | A | * | 9/1994 | McDonald et al. | 385/19 |
| 5,596,185 | A | | 1/1997 | Bross et al. | |
| 5,768,009 | A | * | 6/1998 | Little | 359/293 |
| 5,828,485 | A | * | 10/1998 | Hewlett | 359/291 |
| 5,940,204 | A | * | 8/1999 | Hewlett | 359/223 |
| 6,128,078 | A | | 10/2000 | Fateley | |
| 6,145,784 | A | * | 11/2000 | Livingston | 244/3.11 |
| 6,250,583 | B1 | * | 6/2001 | Livingston | 244/3.13 |
| 6,278,542 | B1 | * | 8/2001 | Hewlett | 359/291 |
| 6,343,766 | B1 | * | 2/2002 | Livingston | 244/3.13 |
| 6,642,498 | B2 | * | 11/2003 | Verdonk et al. | 385/18 |
| 6,714,336 | B2 | * | 3/2004 | Orcutt et al. | 359/290 |
| 2002/0071185 | A1 | | 6/2002 | Chretien et al. | |
| 2003/0174234 | A1 | * | 9/2003 | Kondo et al. | 348/362 |

FOREIGN PATENT DOCUMENTS

| EP | 0 562 424 A1 | 3/1993 |
| WO | 97/05742 A1 | 2/1997 |
| WO | 03/023494 A1 | 3/2003 |

* cited by examiner

*Primary Examiner*—Bernarr E Gregory
(74) *Attorney, Agent, or Firm*—Venable LLP; Michael A. Satori; Jeffri A. Kaminski

(57) ABSTRACT

An optical system comprising a first optical unit and a first sensor unit for sensing electromagnetic radiation. The optical system also comprises a micromirror matrix unit which is arranged in the beam path between the first optical unit and the first sensor unit. The micromirror matrix unit is arranged to be able to be set in at least a first and a second state. In the first state, the micromirror matrix unit reflects incident electromagnetic radiation such that it reaches the first sensor unit. In the second state, the micromirror matrix unit reflects incident electromagnetic radiation such that it does not reach the first sensor unit. The invention also concerns a target-seeking system comprising such an optical system.

21 Claims, 1 Drawing Sheet

APPROVED: /BG/

OPTICAL SYSTEM

FIELD OF THE INVENTION

The present invention relates to an optical system comprising a first optical unit and a first sensor unit for sensing electromagnetic radiation. The optical system is arranged such that incident electromagnetic radiation that originates from some scene outside of the optical system can reach the first sensor unit by passing via the first optical unit and by following a beam path from the first optical unit to the first sensor unit.

BACKGROUND OF THE INVENTION

WO 97/05742-A1 describes a system that can be used for detecting infra-red (IR) radiation. The system can, for example, be used in a target-seeking missile. The document describes a switchable mirror which can be set in two different positions. In a first position, the mirror is not active. In this position, radiation from an observed scene, which goes in through an objective lens, can reach a detector array. In a second position of the mirror, radiation from the scene is prevented from reaching the detector array. Instead, radiation from a light emitting diode is reflected towards the detector array. The light emitting diode is used as a temperature reference. In this system, it takes a relatively long time to move the mirror from the first to the second position and vice versa.

SUMMARY OF THE INVENTION

It is desirable to be able to quickly switch the electromagnetic radiation, which is present, between an optical unit and a sensor unit in a system for sensing electromagnetic radiation, which is arranged such that incident electromagnetic radiation that originates from outside the optical system can reach the first sensor unit via the first optical unit by following a beam path from the first optical unit to the first sensor unit. Such quick switching can be advantageous for many different reasons. Among other things, such quick switching can be used for reducing the probability that the optical system is discovered by devices that search for retroreflexes from such an optical system. Furthermore, quick switching can be advantageous in order to prevent the system from being destroyed by destroying radiation. Additional advantages of the system according to the invention will be clear from the description below.

The above mentioned purpose and advantages are achieved by the described optical system in which the optical system also comprises a micromirror matrix unit that comprises a large number of micromirror elements and which is arranged in the beam path, wherein the micromirror matrix unit is arranged to be able to be set in at least a first and a second state, wherein in the first state of the micromirror matrix unit reflects the incident electromagnetic radiation which reaches the micromirror matrix unit from the first optical unit such that this electromagnetic radiation reaches the first sensor unit, wherein in the second state, the micromirror matrix unit reflects the incident electromagnetic radiation which reaches the micromirror matrix unit from the first optical unit such that this electromagnetic radiation does not reach the first sensor unit.

By positioning such a micromirror matrix unit in the beam path, the radiation can be switched very quickly. A micromirror matrix may, for example, be made to switch between two states in less than 10 µs. The micromirror matrix may thus very quickly be switched between the first and second states. This has many advantages in different contexts. If the optical system, for example, is used as a target-seeking system, the optical system may be exposed to retroreflex searching. Electromagnetic radiation which enters through the first optical unit and which is led to the first sensor unit can be reflected back the same way, since the first sensor unit usually is positioned such that possible reflections from the sensor unit at least partly are reflected back in the opposite direction to the incident radiation. This is used in so-called retroreflex searching. Such a search is done in such a manner that the searching device scans over a certain area in order to look for retroreflexes. In this manner, the optical system can be discovered. Through the present invention, however, the radiation can be switched very quickly. It is therefore not necessary that radiation from the first optical unit be led to the first sensor unit the whole time. Further advantages of the invention will be described below.

It can be noted that it is known to in a different manner use a micromirror matrix unit in an IR-detecting system. U.S. Pat. No. 5,323,002 describes that a light modulator may consist of a digital micromirror device (DMD). This light modulator is used in the beam path from a reference source to a detector. The radiation which has been reflected by the light modulator passes through non-imaging optics and further to the detector via a "chopper".

According to an advantageous embodiment of the present invention, the first sensor unit comprises a large number of sensor elements and is positioned in an image plane in the optical system, which image plane is arranged to be able to constitute an image plane for the scene. The first sensor unit is preferably arranged in an image plane for the scene in question. There are different kinds of sensor systems, such as so-called staring systems and scanning systems. In a scanning system, the electromagnetic beam is scanned in one or two directions. If the radiation is scanned in two directions, the sensor unit needs only consist of a single sensor element. However, it is advantageous if the sensor unit comprises a large number of sensor elements. The sensor elements may be arranged in a row. In this case, the beam in question is suitably scanned in one direction (crosswise to the row) such that the row of sensor elements can sense the whole scene from which the electromagnetic radiation originates. By using a plurality of sensor elements, the scene may thus be sensed faster.

According to a further advantageous embodiment, the first sensor unit is such that the sensor elements are arranged as a two-dimensional array of sensor elements and the optical system is constructed as a staring system. Since the sensor elements are arranged as a two-dimensional array, no means are needed in order to scan the beam in question. The system is thus, in this case, "staring". This is advantageous, since the scene thereby can be sensed quickly, since all sensor elements can, at the same time, sense different parts of the scene. Furthermore, the system can be made smaller and simpler, since no scanning element is needed.

The image plane, in which the first sensor unit is positioned, is typically arranged in the optical system such that it constitutes an image plane for the scene when the scene is located at such a large distance from the optical system that rays from a point in the scene reach the first optical unit as at least substantially parallel rays. The optical system is particularly suited to be used when the scene is positioned at a relatively large distance from the optical system. The electromagnetic radiation from the scene can thereby be considered to consist of completely or at least substantially parallel rays which enter the first optical unit.

Preferably, the first sensor unit is arranged to sense radiation within the infra-red wavelength range. The system is particularly suited to be used for detecting IR-radiation.

The optical system can also comprise a second sensor unit for sensing electromagnetic radiation arranged such that when the micromirror matrix unit is set in a state which is different from the first state, the micromirror matrix unit reflects the incident radiation which reaches the micromirror matrix unit from the first optical unit such that this electromagnetic radiation reaches the second sensor unit. Typically, the micromirror matrix unit can be set in the second state when it is set such that the incident electromagnetic radiation reaches the second sensor unit. The second sensor unit can thereby be of another kind than the first sensor unit such that the second sensor unit is less disposed to be destroyed by electromagnetic radiation than the first sensor unit. The second sensor unit can, for example, be used if the optical system is exposed to destroying radiation. Switching can then take place such that the second sensor unit is used instead of the first sensor unit. The second sensor unit can thereby be used for, for example, directing a counter attack against the source of the destroying radiation.

For example, the second sensor unit can be a quadrant detector. The second sensor unit is preferably not arranged in an image plane for the scene. A quadrant detector is relatively durable and inexpensive to produce. Such a detector is therefore suitable to be used for the second sensor unit. If it is desired to sense an electromagnetic beam from some destroying source, no image needs to be formed on this sensor unit. Consequently, the second sensor unit is preferably not arranged in an image plane.

The optical system can be arranged to prevent the incident electromagnetic radiation from the scene from being reflected back to the scene from the second sensor unit. This can be done in different ways. For example, an optical isolator can be arranged in the beam path between the first optical unit and the second sensor unit. The second sensor unit can thereby be arranged somewhat inclined, such that it is not arranged perpendicularly relative to the incident radiation. This reduces the risk for retroreflexes.

The optical system may comprise at least one reference source for emitting electromagnetic radiation of a known kind, wherein this reference source is arranged such that electromagnetic radiation from the reference source reaches the first sensor unit when the micromirror matrix unit is set in a state which differs from the first state. Such a reference source can be used for calibrating the sensor unit. For an IR-system, the reference source thus constitutes a temperature reference. Preferably, the reference source can be set at two different temperatures in order to improve the calibration of the sensor unit.

According to an advantageous embodiment, the reference source is arranged such that electromagnetic radiation from the reference source reaches the first sensor unit when the micromirror matrix unit is set in the second state. The calibration of the first sensor unit can thereby take place as soon as the micromirror matrix unit is set in the second state.

The optical system may comprise a control unit which controls at least the setting of the micromirror matrix unit. The control unit can also control the sensing of the first sensor unit, such that the first sensor unit is sensed at a plurality of occasions per second, wherein the control unit is arranged to between these two sensing occasions control the micromirror matrix unit such that it is not in the first state. The first sensor unit thereby only needs to be engaged to sense the scene during the short times when it is actually sensed with regard to incident radiation. Between these occasions, the first sensor unit is disengaged from the incident radiation from the scene. This means that the risk that the optical system is discovered by a device which performs retroreflex searching is reduced.

According to an advantageous embodiment, the optical system comprises means for detecting if the optical system is exposed to scanning or destroying radiation, wherein the control unit is arranged to control the micromirror matrix unit such that the first state is avoided when the means has detected such radiation.

The micromirror matrix unit may thereby be controlled such that it reflects the incident electromagnetic radiation such that it reaches the second sensor unit. The means for detecting if the optical system is exposed to scanning or destroying radiation can consist of the first sensor unit together with the control unit. The control unit can thus register if suspected scanning radiation is incident on the first sensor unit. Alternatively, a separate detector can be used for detecting such radiation. As soon as such radiation is detected, the micromirror matrix unit is preferably switched. Such a switching of the micromirror matrix unit can take place very quickly. Thereby the first sensor unit is protected from being exposed to destroying radiation. The second sensor unit can, as has been explained above, be designed to be less sensitive to destroying radiation.

The control unit can also be arranged to individually control the setting of the mirror elements of the micromirror matrix unit in such a manner that the amount of electromagnetic radiation which is reflected by the micromirror matrix unit towards the first sensor unit is controlled by the setting of the mirror elements of the micromirror matrix unit. The micromirror matrix unit can thereby be used for so-called dynamic control. By, for example, "angling away" a number of mirror elements which are randomly selected, the electromagnetic radiation which is reflected towards the first sensor unit is reduced. It may also be possible to control the setting of the mirror elements such that, for example, certain peripheral mirror elements are "angled away". If the micromirror matrix unit is properly positioned in the beam path, the micromirror matrix unit can thereby function in a similar manner as a traditional aperture in a camera system.

The invention also concerns a target-seeking system. This target-seeking system comprises an optical system according to any of the preceding embodiments. The target-seeking system is, for example, a target-seeking missile. The invention is particularly useful in connection with such target-seeking systems.

BRIEF DESCRIPTION OF THE DRAWINGS

The present invention will now be explained with the help of embodiments, given as examples, and with reference to the annexed drawings.

DESCRIPTION OF EMBODIMENTS OF THE INVENTION

Figure 1:
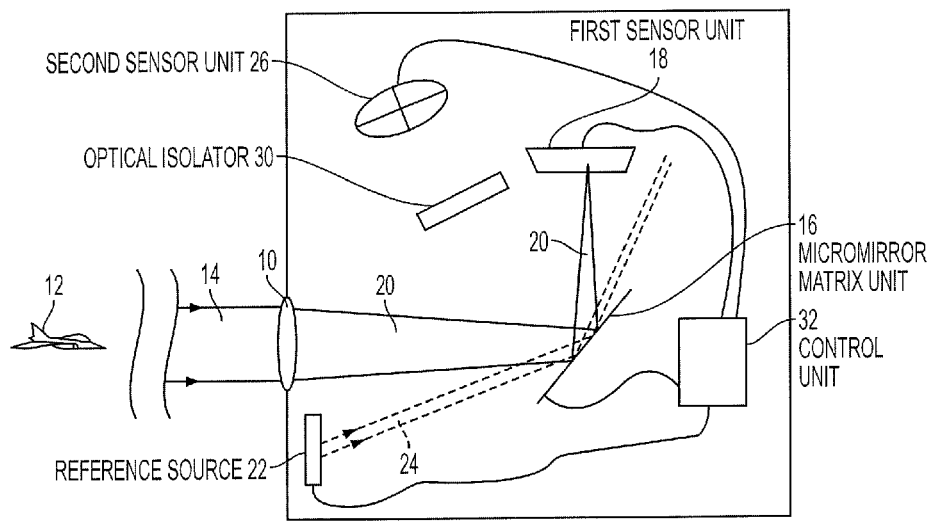
FIG. 1 shows schematically an optical system according to the invention with the micromirror matrix unit set in a first state.

FIG. 1 shows schematically an optical system according to an embodiment of the invention. The optical system comprises a lens 10. FIG. 1 also schematically illustrates a scene in the form of an aeroplane 12 which is located outside of the optical system. The scene 12 is usually located at a large distance from the optical system such that incident electromagnetic radiation 14 from the scene 12 is incident on the lens 10 as parallel rays.

The optical system also comprises a micromirror matrix unit 16 and a first sensor unit 18 for sensing electromagnetic radiation. The micromirror matrix unit 16 has a large number of micromirror elements. Such a micromirror matrix unit (DMD) 16 can for example be of the kind which is provided by Texas Instruments Incorporated in Dallas, Tex. A DMD can for example consist of 1280×1024 micromirror elements. Each micromirror element may for example be about the size 16 μm×16 μm.

The micromirror matrix unit 16 is able to be set in at least a first and a second state. In the first state, for example, all micromirror elements can be arranged in one of their end positions. If a sufficient flatness can be achieved, it is also possible that all micromirror elements are in their neutral rest position when the micromirror matrix unit 16 is set in the first state. In the second state of the micromirror matrix unit 16, the micromirror elements are arranged such that they are set in their second end positions. In FIG. 1, the micromirror matrix unit 16 is considered to be set in the first state. In this state, the micromirror matrix unit 16 reflects the electromagnetic radiation from the lens 10 such that this radiation reaches the first sensor unit 18. The micromirror matrix unit 16 is thus arranged in the beam path 20 from the lens 10 to the first sensor unit 18.

The first sensor unit 18 is, according to this embodiment, of the kind where a large number of sensor elements are arranged as a two dimensional array. An example of such a sensor unit is the sensor unit BD MM 003 which is delivered by Sofradir in Chatenay-Malabry, France. Such a sensor unit may for example have 128×128 sensor elements. The first sensor unit 18 is thus suitably arranged in an image plane, where an image of the scene 12 is formed. According to the schematic set up which is shown in FIG. 1, this means that the first sensor unit 18 is positioned in the focal plane of the lens 10. It should however be noted that FIG. 1 only shows a schematic embodiment. There may in fact be more optical units along the beam path 20. For example, an optical unit may also be arranged in the beam path 20 between the micromirror matrix unit 16 and the first sensor unit 18.

It should also be noted that the embodiment according to FIG. 1 is a so-called "staring system". Alternatively, it is also possible to use a scanning system. In such a system, no two-dimensional sensor unit of the kind which is shown in FIG. 1 is needed. Instead one or two scanning elements are arranged in the beam path 20.

The first sensor unit 18 is preferably arranged to sense IR radiation. In order to be able to calibrate the first sensor unit 18, the optical system also comprises a reference source 22. The reference source 22 emits electromagnetic radiation 24 of a known kind, i.e. the reference source 20 constitutes a temperature reference. Preferably, this temperature can be varied such that the reference source 22 can emit radiation representing at least two different temperatures. When the micromirror matrix unit 16 is set in the first state, radiation 24 from the reference source 22 does not reach the first sensor unit 18. The radiation 24 from the reference source 22 is here represented by broken lines.

Figure 2:
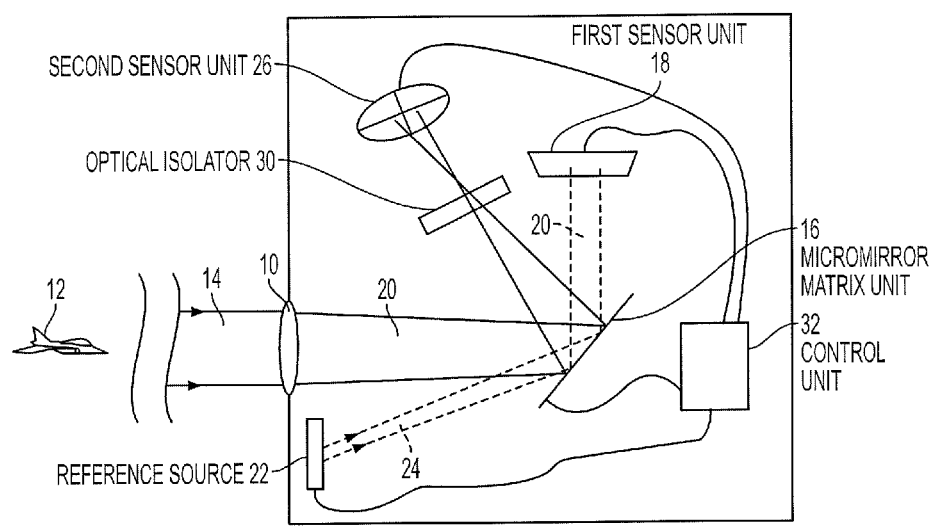
FIG. 2 shows schematically the optical system according to FIG. 1 but with the micromirror matrix unit set in a second state.

According to the preferred embodiment, the optical system comprises also a second sensor unit 26. The second sensor unit is preferably a simpler and less expensive kind than the first sensor unit 18. The second sensor unit 26 may for example consist of a quadrant detector. Such a sensor unit 26 is less sensitive and less disposed to be destroyed by electromagnetic radiation than the first sensor unit 18. In FIG. 1 an optical isolator 30, which will be described more closely in connection with FIG. 2, is also schematically shown.

The optical system also comprises a control unit 32. The control unit 32 controls the optical system and co-ordinates the different units with each other. It is thus shown in FIG. 1 that the control unit 32 is connected to the micromirror matrix unit 16, the first sensor unit 18, the second sensor unit 26 and the reference source 22.

As has been described above, there is a risk that the optical system will be exposed to searching radiation. With the help of such searching radiation, an area is searched in order to discover retroreflexes. When such searching radiation enters through the lens 10, this radiation can be reflected by the first sensor unit 18 and exit through the lens 10 to be detected by the searching device. In order to reduce the probability that such a retroreflex via the first sensor unit 18 arises, the control unit 32 is suitably arranged to control the micromirror matrix unit 16 such that the incident radiation from the scene 12 only intermittently reaches the first sensor unit 18. The optical system usually works with a certain image frequency. For example, the image frequency can be 50 Hz, i.e. the first sensor unit 18 is sensed 50 times per second. However, each sensing occasion only needs to last a few ms, for example, less than 5 ms. The control unit 32 can thus control the micromirror matrix unit 16 such that the micromirror matrix 16 assumes the first state only during the time when the first sensor unit 18 is sensed. Therefore, the larger part of the time, no retroreflex via the first sensor unit 18 can occur. This reduces the risk of discovery by searching radiation.

The optical system can also be arranged with means for detecting such searching radiation. This can be done in that the control unit 32 registers that the first sensor unit 18 is exposed to such radiation. The control unit 32 can thereby be arranged to immediately switch the micromirror matrix unit 16 so that it is no longer in the first state. The micromirror matrix unit 16 can thus be set in at least a second state.

FIG. 2 shows schematically the same system as FIG. 1 but with the micromirror matrix unit 16 set in a second state. In this second state, the micromirror matrix unit 16 is set so that incident radiation 14 from the scene 12 does not reach the first sensor unit 18 but instead is directed towards the second sensor unit 26. Since the second sensor unit 26, according to this example, is a quadrant detector, the second sensor unit 26 is preferably not positioned exactly in an image plane.

If the first sensor unit 18 has been exposed to searching radiation, the micromirror matrix 16 is switched so that the radiation is directed in the manner that is shown in FIG. 2. After the discovery with the help of searching radiation, usually a destroying radiation follows from the device which previously emitted the searching radiation. The purpose of such destroying radiation is to destroy the optical system, in particular the first sensor unit 18. Since the micromirror matrix unit 16 is set in the state which is shown in FIG. 2, such a destruction of the first sensor unit 18 is however avoided. Instead, the destroying radiation is directed towards the second sensor unit 26. This second sensor unit 26 is, as mentioned above, less disposed to be destroyed by such destroying radiation. At the same time, the second sensor unit 26 can be used for controlling a counter attack against the device which emits the destroying radiation. It is thereby advantageous if the optical system does not reflect the destroying or searching radiation back. This can, according to the invention, be achieved in different ways, which can also be combined. The second sensor unit 26 can be arranged so that it is not arranged perpendicularly to the incident radiation. This reduces the risk for retroreflex. Furthermore, as has been mentioned, the second sensor unit 26 is preferably not arranged in an image plane. The destroying radiation which hits the second sensor unit 26 is thereby more scattered, which reduces the amount of retroreflected radiation. Furthermore, an optical isolator 30 can be arranged in the beam path towards the second sensor unit 26. Such an optical isolator 30 can be constructed in different manners which are known to a person skilled in the art. For example, such an optical isolator may consist of a linear polariser in series with a so-called λ/4 plate. When the device which emits the destroying radiation has been destroyed, or when destroying or scanning radiation is no longer detected, the control unit 32 can control the micromirror matrix unit 16 such that it returns to the first state which is shown in FIG. 1.

The reference source 22 is suitably arranged such that when the micromirror matrix unit 16 is in the second state as shown in FIG. 2, radiation from the reference source 22 is directed towards the first sensor unit 18. The first sensor unit 18 can thus be calibrated when the micromirror matrix 16 is in the second state. When the optical system works normally (i.e. when it is not exposed to searching or destroying radiation), the system works, as mentioned above, with a certain image frequency. As has been mentioned above, the micromirror matrix unit 16 is preferably switched to the second state between each sensing. Between these sensings, when the micromirror matrix 16 is in the second state, radiation from the reference source 22 can thus be directed towards the first sensor unit 18. A calibration of the first sensor unit 18 can thus take place between the sensings with the normal image frequency. If a longer time is needed for the calibration, some images may be left out in the normal image frequency. Of course, suitable optics can be arranged in the beam path 24 between the reference source 22 and the first sensor unit 18. Such optics may be arranged in the beam path 24 between the reference source 22 and the micromirror matrix unit 16. Such an optic can consist of an non-imaging optic, for example of the kind which is shown in the above mentioned U.S. Pat. No. 5,323,002.

The control unit 32 can also be arranged to individually control the setting of the micromirror elements of the micromirror matrix unit 16 such that the amount of electromagnetic radiation which is reflected by the micromirror matrix unit 16 towards the first sensor unit 18 can be controlled by the setting of the mirror elements. In this manner, the micromirror matrix unit 16 may be used to control the intensity of the radiation that is incident onto the first sensor unit 18. The intensity can be varied by turning away randomly selected mirror elements of the micromirror matrix unit 16. If the micromirror matrix unit 16 is positioned in a suitable position the beam path 20, selected mirror elements, for example in the periphery of the micromirror matrix 16, may be turned away so that the micromirror matrix unit 16 functions in a similar manner as a normal camera aperture.

In the embodiment above, it is described that the micromirror matrix unit 16 can be set in a first and a second state. With a more advanced micromirror matrix unit 16 it is possible that the micromirror matrix unit 16 can assume more than two states. It is thus possible that in a first state, incident radiation is directed towards the first sensor unit 18, in a second state, incident radiation is directed towards the second sensor unit 26 and in a third state, incident radiation is neither directed towards the first sensor unit 18 nor towards the second sensor unit 26.

Figure 3:
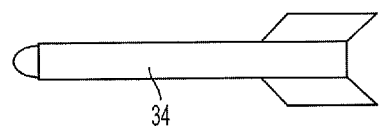
FIG. 3 shows schematically a target-seeking missile.

The optical system may suitable for use in a target-seeking system. Such a target-seeking system can, for example, be arranged on the ground or in an aeroplane. According to a possible embodiment according to the invention, the target-seeking system is a target-seeking missile 34 (see FIG. 3) in which an optical system according to the invention is arranged.

As is clear from the description above, the invention has several advantages. Since the micromirror matrix unit 16 can be quickly switched between at least a first and a second state, the risk that the optical system will be discovered by a system that works with retroreflex searching is reduced. Even if such searching radiation is detected, the risk that the optical system will be destroyed is reduced since the micromirror matrix unit 16 can be quickly switched to a second state. In this second state, the optical system may also be used to control a counter attack against the device which emits destroying radiation, since the second sensor unit 26 can be engaged for this purpose when the micromirror matrix unit 16 has assumed the second state. Furthermore, according to the invention, so-called dynamic control is achieved since individual mirror elements in the micromirror matrix unit 16 can be directed such that the amount of radiation which reaches the first sensor unit 18 (and also the second sensor unit 26) can be controlled. Furthermore, the possibility to quickly make calibrations with the help of the reference source 22 is improved. This makes it possible to correct so-called pattern noise in an efficient manner with the help of the invention.

The present invention is not limited to the described embodiments. The invention may thus be modified and varied within the scope of the following claims.

The invention claimed is:

1. An optical system comprising a first lens and a first sensor unit for sensing electromagnetic radiation, wherein the optical system is arranged such that incident electromagnetic radiation that originates from a scene outside of the optical system reaches the first sensor unit by passing via the first lens and by following a beam path from the first lens to the first sensor unit, wherein the optical system further comprises a micromirror matrix unit, which comprises a plurality of micromirror elements and which is arranged in the beam path, wherein the micromirror matrix unit is set in at least a first or a second state, wherein in the first state the micromirror matrix unit reflects the incident electromagnetic radiation which reaches the micromirror matrix unit from the first lens so that the electromagnetic radiation reaches the first sensor unit, wherein in the second state the micromirror matrix unit reflects the incident electromagnetic radiation which reaches the micromirror matrix unit from the first lens so that the electromagnetic radiation does not reach the first sensor unit.

2. An optical system according to claim 1, wherein the first sensor unit comprises a plurality of sensor elements and is arranged in an image plane in the optical system, which image plane is operable to constitute an image plane for the scene.

3. An optical system according to claim 2, wherein the sensor elements are arranged as a two-dimensional array of sensor elements and wherein the optical system is constructed as a staring system.

4. An optical system, according to claim 3, wherein the image plane, in which the first sensor unit is positioned, is arranged in the optical system so that it constitutes an image plane for the scene when the scene is located at such a distance from the optical system that rays from a point in the scene reach the first lens as at least substantially parallel rays.

5. An optical system according to claim 1, wherein the first sensor unit is operable to sense radiation within the infra-red wavelength range.

6. An optical system according to claim 1, further comprising a second sensor unit operable to sense electromagnetic radiation and arranged so that when the micromirror matrix unit is set in a state which is different from the first state, the micromirror matrix unit reflects the incident electromagnetic radiation which reaches the micromirror matrix unit from the first optical unit so that this electromagnetic radiation reaches the second sensor unit.

7. An optical system according to claim 6, wherein the micromirror matrix unit is in the second state unit when it is set such that the incident electromagnetic radiation reaches the second sensor unit.

8. An optical system according to claim 7, wherein the second sensor unit is of another kind than the first sensor unit, such that the second sensor unit is less disposed to be disposed by electromagnetic radiation than the first sensor unit.

9. An optical system according to claim 8, wherein the second sensor unit is a quadrant detector.

10. An optical system according to claim 9, wherein the second sensor unit is arranged in the optical system so that it is not in an image plane for the scene, when the scene is located at such a distance from the optical system that rays from a point in the scene reach the first optical unit as at least substantially parallel rays.

11. An optical system according to claim 10, arranged to prevent incident electromagnetic radiation from the scene being reflected back to the scene from the second sensor unit.

12. An optical system according to claim 11, further comprising an optical isolator in the beam path between the first lens and the second sensor unit.

13. An optical system according to claim 1, comprising at least one reference source for emitting electromagnetic radiation of a known kind, wherein the reference source is arranged so that electromagnetic radiation from the reference source reaches the first sensor unit when the micromirror matrix unit is set in a state which differs from the first state.

14. An optical state according to claim 13, wherein the reference source is arranged so that electromagnetic radiation from the reference source reaches the first sensor unit when the micromirror matrix unit is set in the second state.

15. An optical system according to claim 14, further comprising a control unit which controls at least the setting of the micromirror matrix unit.

16. An optical system according to claim 15, wherein the control unit is also arranged to control the sensing of the first sensor unit, so that the first sensor unit senses at a plurality of occasions per second and wherein the control unit is operable to control the micromirror matrix unit between the sensing occasions so that it is not in the first state.

17. An optical state according to claim 16, further comprising means for detecting if the optical system is exposed to scanning or destroying radiation, wherein the control unit is arranged to control the micromirror matrix unit so that the first state is avoided when said the detecting means has detected scanning or destroying radiation.

18. An optical system according to claim 17, wherein the control unit is arranged to, when the means has detected scanning or destroying the radiation control the micromirror matrix unit so that it reflects the incident electromagnetic radiation which reaches the micromirror matrix unit from the first lens so that the electromagnetic radiation reaches the second sensor unit.

19. An optical system according to claim 18, wherein the control unit is arranged to individually control of setting of the mirror elements of the micromirror matrix unit so that an amount of electromagnetic radiation which is reflected by the micromirror matrix units towards the first sensor unit is controlled by the setting of the mirror elements of the micromirror matrix unit.

20. A target-seeking system comprising an optical system comprising a first lens and a first sensor unit for sensing electromagnetic radiation, wherein the optical system is arranged such that incident electromagnetic radiation that originates from a scene outside of the optical system reaches the first sensor unit by passing via the first lens and by following a beam path from the first lens to the first sensor unit, wherein the optical system further comprises a micromirror matrix unit, which comprises a plurality of micromirror elements and which is arranged in the beam path, wherein the micromirror matrix unit is set in at least a first or a second state, wherein the first state the micromirror matrix unit reflects the incident electromagnetic radiation which reaches the micromirror matrix unit from the first optical unit so that the electromagnetic radiation reaches the first sensor unit, wherein in the second state the micromirror matrix unit reflects the incident electromagnetic radiation which reaches the micromirror matrix unit from the first lens from the first lens so that the electromagnetic radiation does not reach the first sensor unit.

21. A target-seeking system according to claim 20, wherein the target-seeking system is a target-seeking missile.

* * * * *